US008665293B2

(12) United States Patent
Bou et al.

(10) Patent No.: US 8,665,293 B2
(45) Date of Patent: Mar. 4, 2014

(54) AUTOMATIC DRAW ORDER

(75) Inventors: Robert E. Bou, Austin, TX (US); Daniel Lee Thompson, Austin, TX (US)

(73) Assignee: Autodesk, Inc., San Rafael, CA (US)

(*) Notice: Subject to any disclaimer, the term of this patent is extended or adjusted under 35 U.S.C. 154(b) by 3916 days.

(21) Appl. No.: 09/859,959

(22) Filed: May 16, 2001

(65) Prior Publication Data

US 2002/0171671 A1     Nov. 21, 2002

(51) Int. Cl.
| | | |
|---|---|---|
| G09G 5/00 | (2006.01) | |
| G09G 5/14 | (2006.01) | |
| G06T 11/00 | (2006.01) | |
| G06T 15/00 | (2011.01) | |
| G06T 19/00 | (2011.01) | |
| G06T 11/60 | (2006.01) | |

(52) U.S. Cl.
CPC G09G 5/14 (2013.01); G06T 11/00 (2013.01); G06T 15/00 (2013.01); G06T 19/00 (2013.01); G06T 11/60 (2013.01)
USPC ........... 345/629; 345/418; 345/419; 345/420; 345/421; 345/422; 345/423; 345/424; 345/426; 345/427; 345/630; 345/631; 345/637; 345/641; 345/661

(58) Field of Classification Search
CPC .......... G09G 5/14; G06T 11/00; G06T 11/60; G06T 19/00; G06T 15/00
USPC ......... 345/619, 440, 419, 421, 661, 666, 629; 715/790, 796, 797, 768; 346/629–64, 346/418–424
See application file for complete search history.

(56) References Cited

U.S. PATENT DOCUMENTS

| | | | | |
|---|---|---|---|---|
| 4,800,510 A | * | 1/1989 | Vinberg et al. | 345/440 |
| 5,019,961 A | * | 5/1991 | Addesso et al. | 700/87 |
| 5,046,001 A | * | 9/1991 | Barker et al. | 715/794 |
| 5,249,265 A | * | 9/1993 | Liang | 715/853 |
| 5,289,568 A | * | 2/1994 | Hosoya et al. | 345/630 |
| 5,490,246 A | * | 2/1996 | Brotsky et al. | 715/763 |
| 5,572,639 A | * | 11/1996 | Gantt | 345/651 |
| 5,666,474 A | * | 9/1997 | Otto | 345/421 |
| 5,669,006 A | * | 9/1997 | Joskowicz et al. | 715/517 |
| 5,681,674 A | * | 10/1997 | Fujimoto | 430/5 |
| 5,684,936 A | * | 11/1997 | Otto | 345/421 |
| 5,701,403 A | * | 12/1997 | Watanabe et al. | 345/419 |
| 5,838,313 A | * | 11/1998 | Hou et al. | 715/500.1 |
| 5,867,163 A | * | 2/1999 | Kurtenbach | 345/840 |
| 5,877,768 A | * | 3/1999 | Jain | 345/421 |
| 5,894,310 A | * | 4/1999 | Arsenault et al. | 345/679 |
| 6,005,574 A | * | 12/1999 | Herrod | 715/807 |

(Continued)

OTHER PUBLICATIONS

Arabshahi, S. et al., "Steps Toward CAD-FEA Integration," *Engineering With Computers*, 1993, vol. 9, pp. 17-26, XP-002131561.

(Continued)

*Primary Examiner* — Jin-Cheng Wang
(74) *Attorney, Agent, or Firm* — Gates & Cooper LLP

(57) ABSTRACT

A method, apparatus, and article of manufacture for automating a draw order of entities output from a computer. A drawing output from a computer (e.g., on a display device) is obtained by a drawing program and examined to identify two or more entities that overlap/intersect. The drawing program then automatically determines the drawing order for the two or more entities based on a set of one or more predefined rules.

42 Claims, 8 Drawing Sheets

(56) References Cited

U.S. PATENT DOCUMENTS

| | | | |
|---|---|---|---|
| 6,016,147 A * | 1/2000 | Gantt | 345/420 |
| 6,040,833 A * | 3/2000 | Henshaw | 715/794 |
| 6,043,824 A * | 3/2000 | Bier | 345/630 |
| 6,069,633 A * | 5/2000 | Apparao et al. | 345/421 |
| 6,163,318 A * | 12/2000 | Fukuda et al. | 715/803 |
| 6,169,550 B1 * | 1/2001 | Jain | 345/421 |
| 6,215,502 B1 * | 4/2001 | Ferguson | 345/648 |
| 6,232,983 B1 * | 5/2001 | Felser et al. | 345/649 |
| 6,262,741 B1 * | 7/2001 | Davies | 345/423 |
| 6,264,873 B1 * | 7/2001 | Gigl et al. | 264/401 |
| 6,331,852 B1 * | 12/2001 | Gould et al. | 345/419 |
| 6,337,700 B1 * | 1/2002 | Kinoe et al. | 715/854 |
| 6,346,939 B1 * | 2/2002 | Isaacs | 345/421 |
| 6,366,299 B1 * | 4/2002 | Lanning et al. | 345/738 |
| 6,369,829 B1 * | 4/2002 | Bou et al. | 345/619 |
| 6,384,841 B1 * | 5/2002 | Lebovitz et al. | 345/642 |
| 6,392,662 B1 * | 5/2002 | Bou et al. | 345/665 |
| 6,417,865 B1 * | 7/2002 | Bou | 345/619 |
| 6,441,837 B1 * | 8/2002 | Harding et al. | 345/856 |
| 6,462,751 B1 * | 10/2002 | Felser et al. | 345/619 |
| 6,466,953 B1 * | 10/2002 | Bonney et al. | 715/502 |
| 6,476,814 B1 * | 11/2002 | Garvey | 345/440 |
| 6,492,989 B1 * | 12/2002 | Wilkinson | 345/440 |
| 6,509,906 B1 * | 1/2003 | Awe et al. | 345/619 |
| 6,512,519 B1 * | 1/2003 | Arsenault et al. | 345/441 |
| 6,515,675 B1 * | 2/2003 | Bourdev | 345/629 |
| 6,587,746 B1 * | 7/2003 | D'Souza | 700/182 |
| 6,853,375 B2 * | 2/2005 | Jou et al. | 345/420 |

OTHER PUBLICATIONS

Arias, A. et al., "A Parametric Model of Structures Representation and its Integration in a Shape Optimal Design Procedure," Computer Aided Optimum Design of Structures 91, *Structural Systems and Industrial Applications*, Cambridge, MA, USA, Jun. 25-27, 1991; pp. 401-412, XP000879386.

Lu, S.C. et al., "Integration of CAD and FEA for Concurrent Engineering Design of Sheet Stamping," Transactions of the American Society of Mechanical Engineers, *Journal of Manufacturing Science and Engineering*, Aug. 1, 1996, vol. 118, pp. 310-317, XP000622438.

* cited by examiner

AUTOMATIC DRAW ORDER

CROSS-REFERENCE TO RELATED APPLICATIONS

This application is related to the following co-pending and commonly-assigned patent application, which application is incorporated by reference herein:

U.S. patent application Ser. No. 09/226,690, entitled "DRAW ORDER PRESERVATION IN A COMPUTER-IMPLEMENTED GRAPHICS SYSTEM", by Robert E. Bou, et. al., filed on Jan. 7, 1999.

BACKGROUND OF THE INVENTION

1. Field of the Invention

The present invention relates generally to computer-implemented graphics systems, and in particular, to a method, apparatus, and article of manufacture for automating the drawing order of entities in a computer-implemented graphics system.

2. Description of the Related Art

Computer-implemented graphics systems have been widely used by designers, illustrators, drafters, and engineers for a number of years. Most such graphics systems use a graphical user interface (GUI) to display graphical images, such as 2D or 3D models, schematic diagrams, photorealistic images, etc.

In many instances, the graphical images are comprised of multiple layers of multiple entities or objects, where the draw order of the entities is important to the overall composition of the graphical image. Typical systems display the entities of a drawing in the order that they were originally created. However, an ordering based on the time of creation may not be the desirable order.

For example, if a selected entity is a raster image and the other entities are vector images, the raster image may cover the vector images until the raster image is moved to the "back" of the vector images. Thus, some systems may allow for the reordering and maintenance of the draw order with the overall document. However, the manual creation, management, and maintenance of draw order can be a tedious, time-consuming, and error prone process that may reduce the productivity of a user.

There is a need in the art, then, for techniques that automatically determine a drawing order that is not based on the time of creation.

SUMMARY OF THE INVENTION

A method, apparatus, and article of manufacture for automating the drawing order of entities. A drawing is examined to identify two or more overlapping entities (or potentially overlapping for new entities being drawn). Based on a set of rules, a drawing order is determined and established for the overlapping entities. Each set of overlapping entities may be processed in this manner until a drawing order has been assigned to every set of intersecting entities. To represent the drawing order, a directed graph (preferably acyclic) may be used.

If the draw order is cyclical, priorities/strengths of each draw order relationship may be assigned and/or examined. Such priorities may be designated based on the strength of the rule that resulted in the ordering. The draw order relationship with the highest/least priority is then broken thereby resulting in an acyclic ordering.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
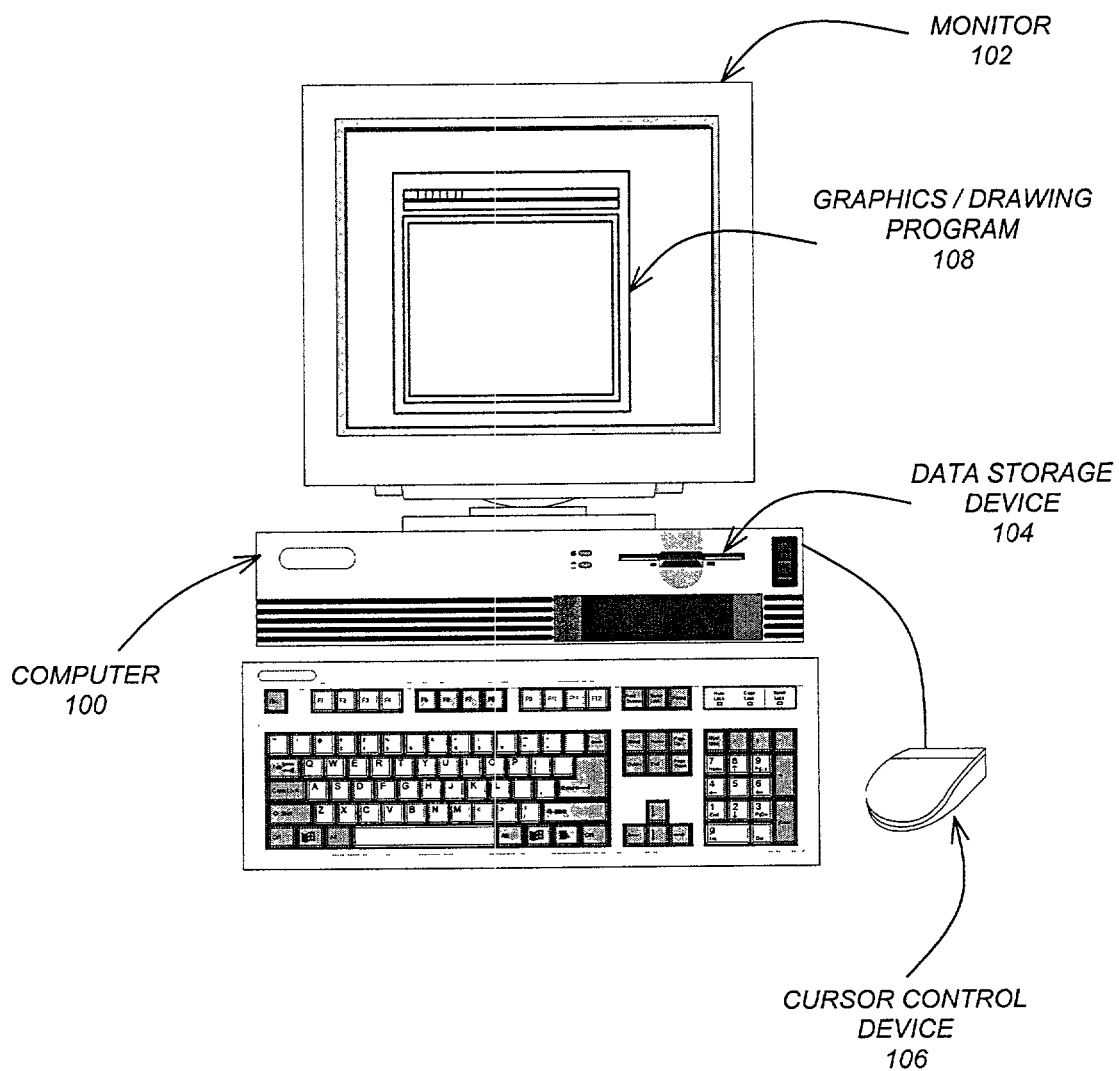
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention attempts to infer the proper draw order for a specific database by applying a set of rules to the database and then observing the behavior of the user during subsequent editing sessions. For example, if a user selects certain text elements for editing purposes, the draw order inference may cause all text of similar specification to display last and therefore always be visible to the user. One or more additional embodiments of the invention may apply a hierarchy of importance to the drawing entities, always displaying the least interesting items first, and then the most interesting items displayed last for best legibility.

Hardware Environment

FIG. 1 is an exemplary hardware and software environment used to implement one or mote embodiments of the invention. Embodiments of the invention are typically implemented using a computer 100, which generally includes, inter alia, a monitor 102, data storage devices 104, cursor control devices 106, and other output devices. Those skilled in the art will recognize that any combination of the above components, or any number of different components, peripherals, and other output devices, may be used with the computer 100.

One or more embodiments of the invention are implemented by a computer-implemented graphics program 108, wherein the graphics program 108 produces output such as output to a printer or a window displayed on a monitor 102. Generally, the graphics program 108 comprises logic and/or data embodied in or readable from a device, media, carrier, or signal, e.g., one or more fixed and/or removable data storage devices 104 connected directly or indirectly to the computer 100, one or mote remote devices coupled to the computer 100 via a data communications device, etc. However, it should be understood that, in the alternative, the present invention may also apply to other computer programs or to specific utilities or functions executing on computer 100. In general, the functions performed in the present invention, whether implemented as part of an operating system or a specific computer program 108, will be referred to herein as "computer programs".

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Software

Figure 2:
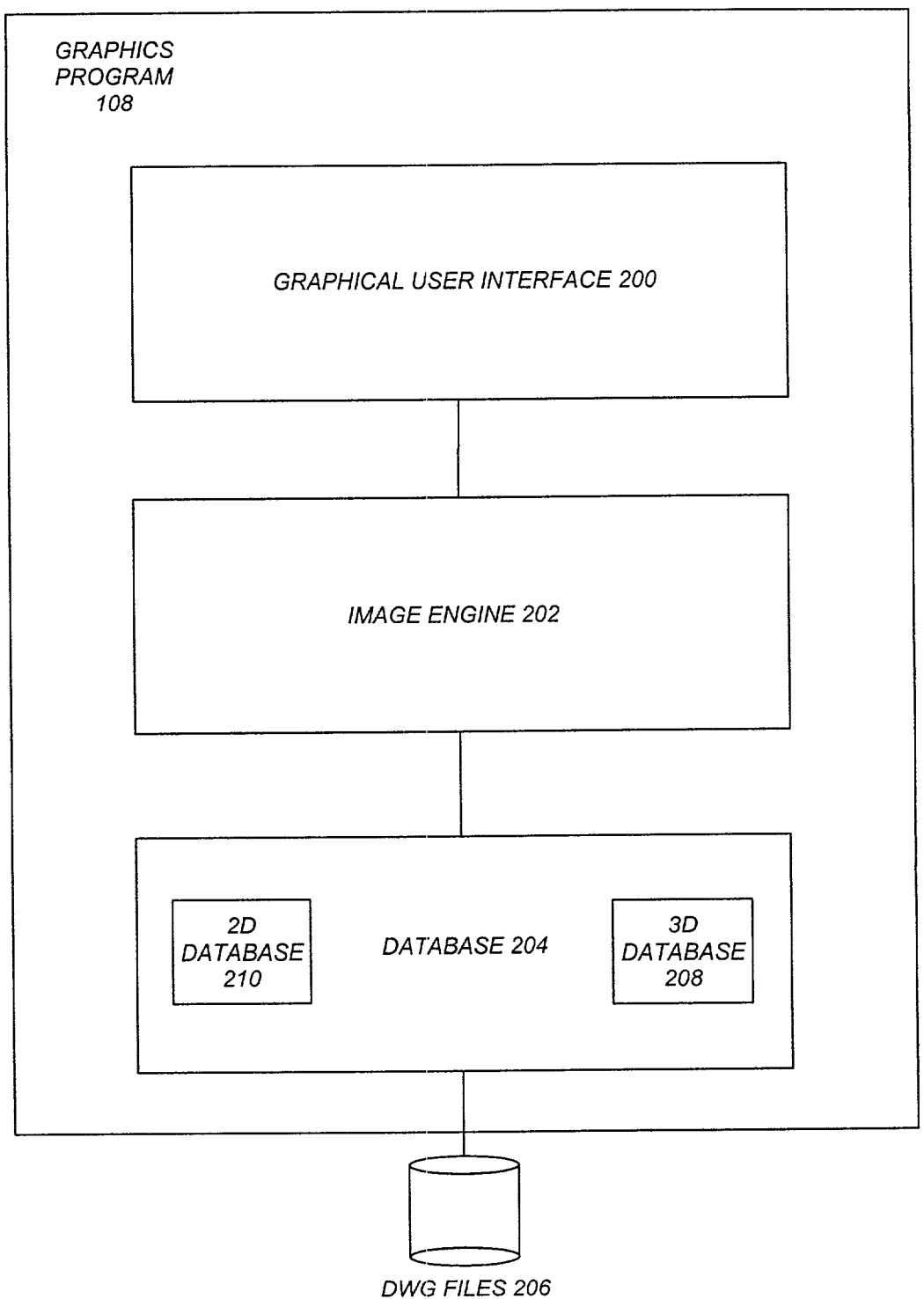
FIG. 2 is a block diagram that illustrates the components of a graphics program in accordance with one or more embodiments of the invention.

FIG. 2 is a block diagram that illustrates the components of the graphics program 108 in accordance with one or more embodiments of the invention. In one or more embodiments, there are three main components to the graphics program 108, including: a Graphical User Interface (GUI) 200, an Image Engine (IME) 202, and a DataBase (DB) 204 for storing objects in Drawing (DWG) files 206. Alternatively, any collection of graphical objects regardless of their original data source may be stored in database 204. Accordingly, the term "drawing" as used herein refers to any arbitrary collection of graphical objects.

The Graphical User Interface 200 displays or outputs information to the operator and provides the functionality for the operator's interaction (if needed) with the graphics program 108.

The Image Engine 202 processes the drawing files 206 and delivers the resulting graphics to an output device (e.g., the monitor 102, a printer, etc.). In the preferred embodiment, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D view ports" that stores 2D information derived from the 3D information.

Display and Selection List

Figure 3:
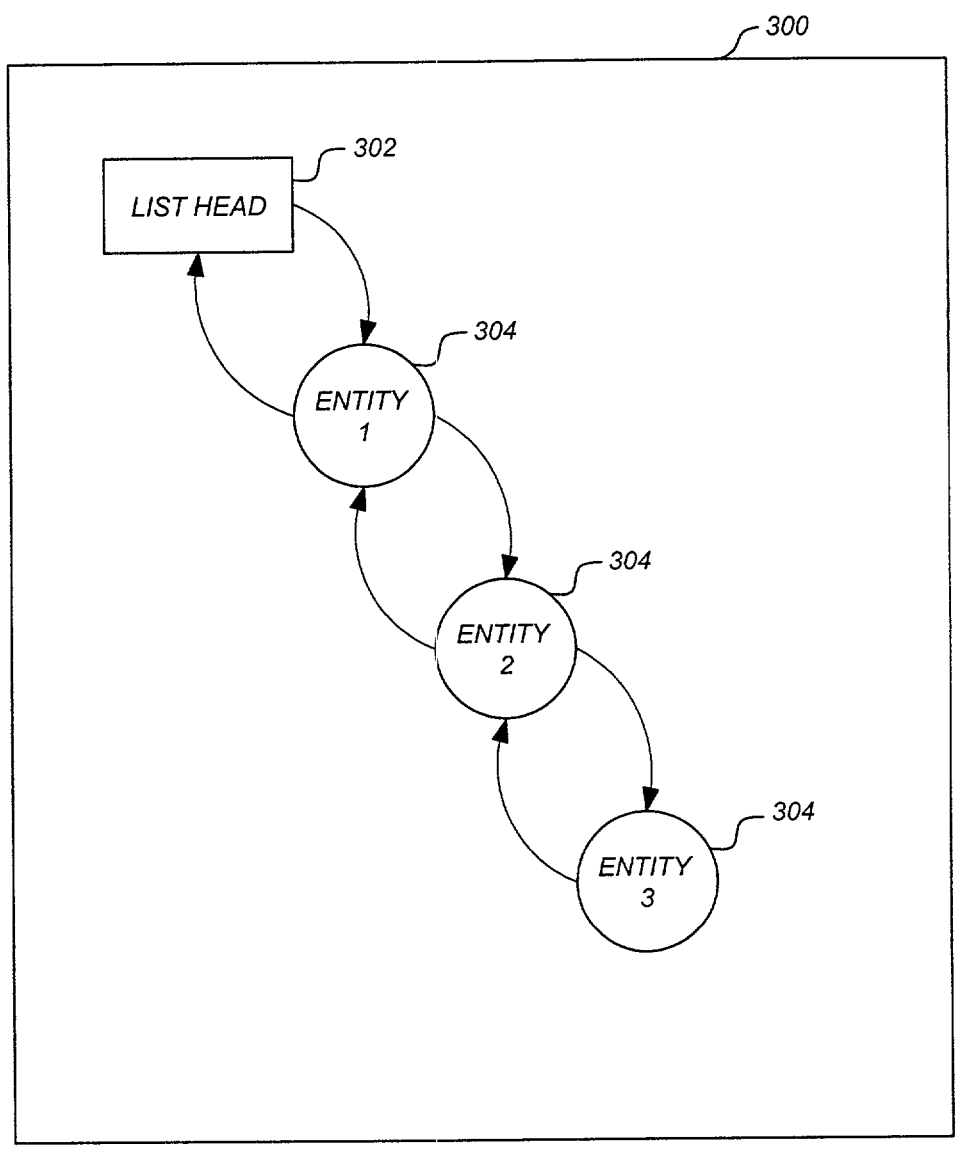
FIG. 3 is a block diagram that illustrates the structure of a display and selection list maintained by 2D databases in accordance with one or mote embodiments of the invention.

FIG. 3 is a block diagram that illustrates the structure of output and a selection list 300 maintained by each of the 2D databases 210 in accordance with one or more embodiments of the invention. The output and selection list 300 is usually comprised of a doubly linked list having a list head 302 and one or more list objects/entities 304, although other structures may be used as well. As described above, in the prior art, the entities 304 are ordered in the output and selection list 300 according to their order of creation, although the order of entities 304 in the list 300 may be changed at any time.

Automatic Draw Order

Figure 4A:
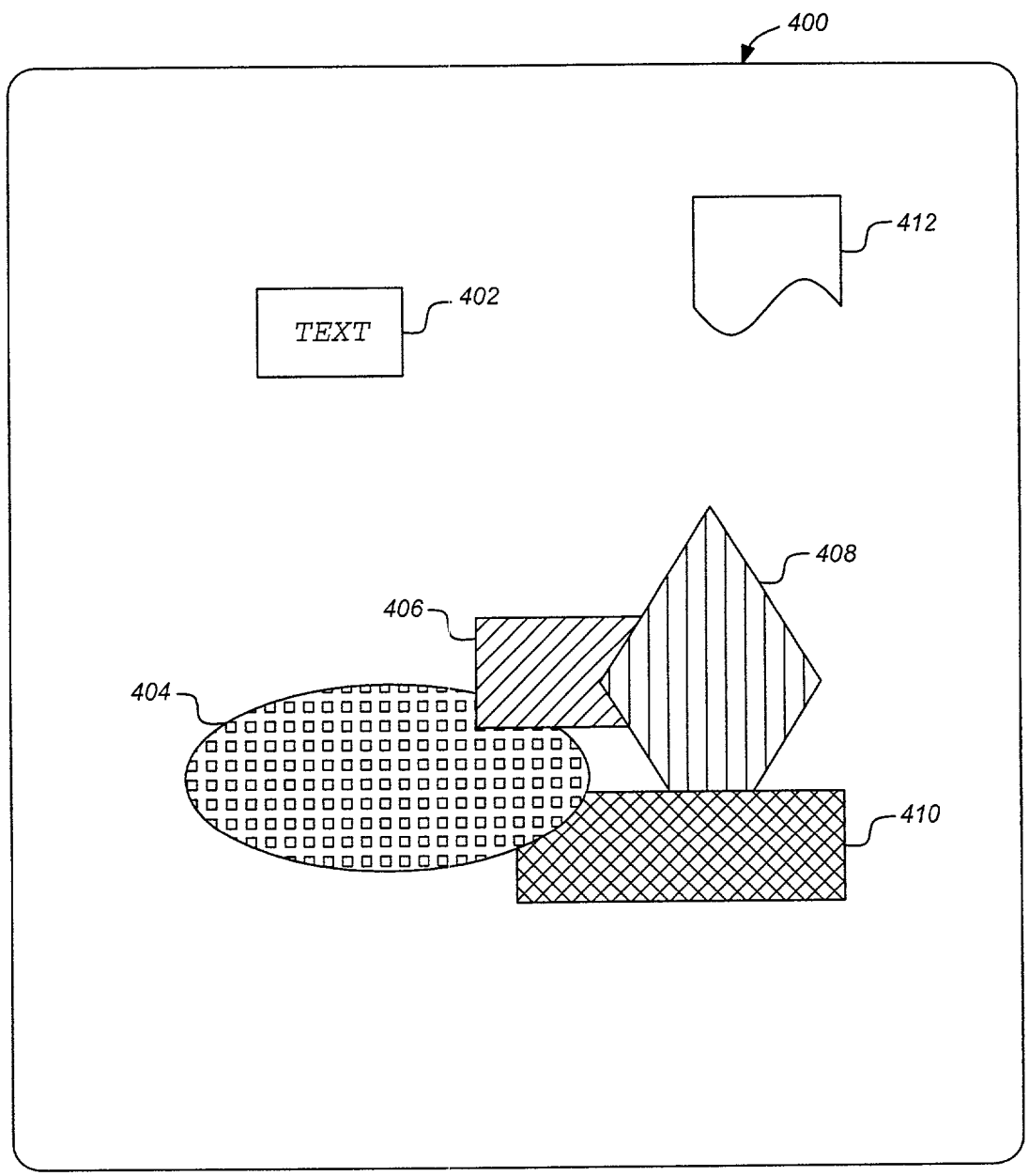
FIG. 4A is a block diagram that illustrates entities displayed in a viewport on a monitor in accordance with one or more embodiments of the invention.

FIG. 4A is a block diagram that illustrates a viewport 400 output by the graphics software 108 in accordance with one or more embodiments of the invention. This viewport 400 includes a plurality of visual representations 402-412 of objects 304 from the associated 2D database 210. As illustrated various entities may be output. For example, entity 402 is a textual entity, entity 412 is a vector entity, and entities 404-410 are raster entities. As illustrated, the raster entities 404-410 comprise complete bitmaps that may obscure any other entity 304 that they are placed on top of.

The entities 402-412 in FIG. 4A are layered and thus each entity 402-412 may obscure part of (i.e., is in "front" of or "over") another entity 402-412. The raster entities 404-410 are ordered cyclically such that entity 404 is under entity 406 and over entity 410, entity 406 is over entity 404 and under entity 408, and entity 408 is over entity 406 and under entity 410. Such a draw order may not be possible in a two-dimensional drawing environment.

The present invention provides a mechanism to automatically order various entities 304 based on a set of predefined rules. Additionally, embodiments of the invention may provide the ability to break a cyclic ordering in a desirable manner.

Logic of the Invention

One or more embodiments of the invention provide the ability to automatically order entities 304 in a drawing. A drawing is examined to determine entities that intersect/overlap in 2D space (or in some flattened 2D projection of a 3D space). For every intersecting pair of entities 304, a decision needs to be made regarding which entity 304 should be drawn first (or have higher priority in a drawing order). Such a decision is based on a set of rules that may be predefined or based on a user's actions within the particular drawing or prior drawings. Each set of intersecting entities 304 may be evaluated in this manner to determine the appropriate drawing order.

Based on the decision regarding drawing order, a directed acyclic graph (DAG) may be developed that can be traversed from multiple start points (i.e., those entities 304 being drawn first) towards multiple endpoints (i.e., those entities 304 being drawn last) to produce a new order that has the desired draw order.

Figure 4B:
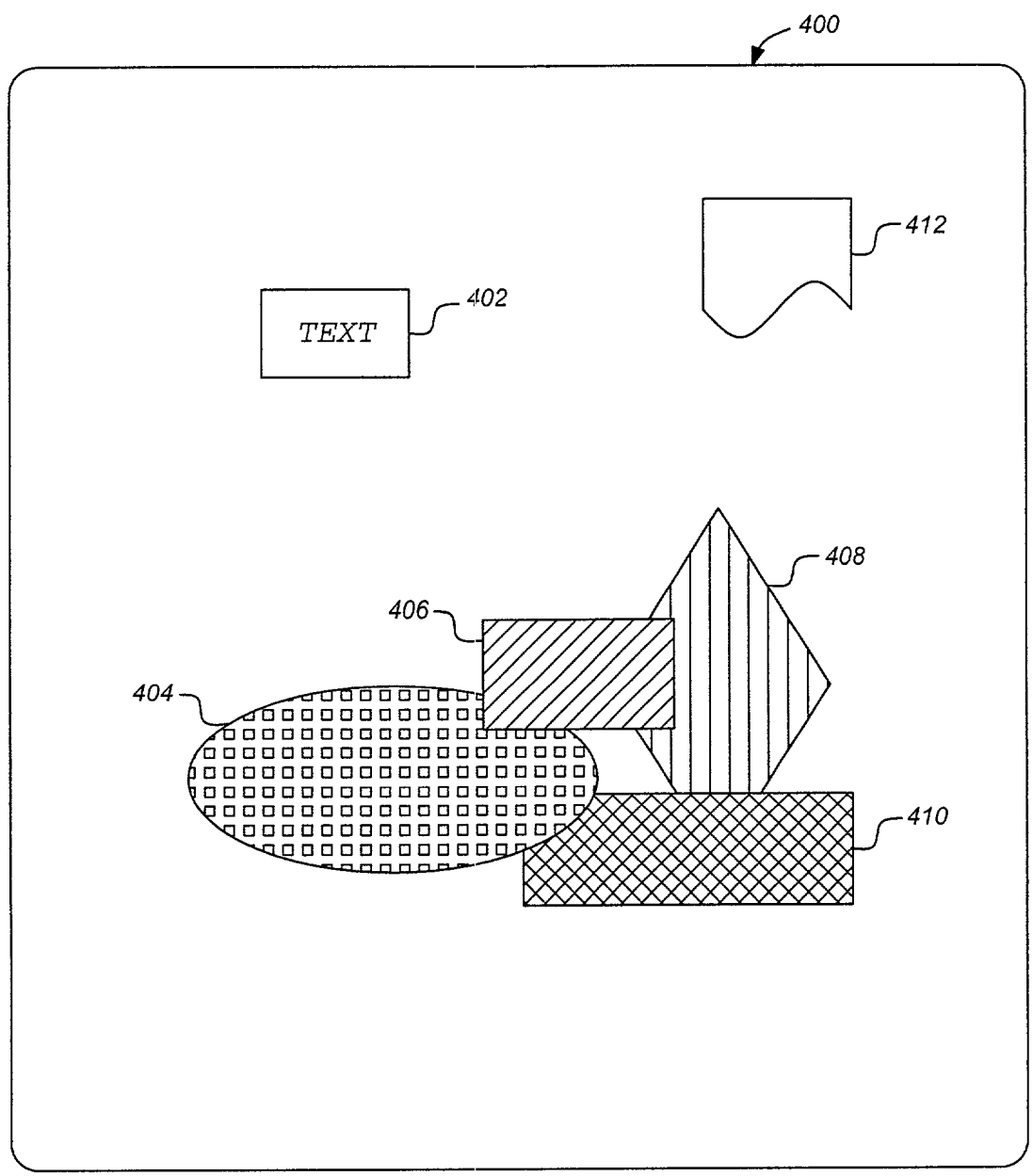
FIG. 4B illustrates the drawing of FIG. 4A wherein entities with a cyclical ordering have been resolved.

One or more embodiments may also provide a mechanism to resolve cyclic ordering such as that illustrated in FIG. 4A. When a directed cyclic graph results based on the set of rules (e.g., A before B before C before A . . . , or in FIG. 4A, 404 before 406 before 408 before 410 before 404 . . . ), priorities/strengths may be assigned to the rules and/or to the relationships between any two given entities 304 (e.g., raster before vector would be very strong while wide line before thin line might be weaker). By assigning priorities, the cyclic chain may be broken at the weakest link. For example, in FIG. 4A, the cyclic chain may be 404, 406, 408, 410, 404 . . . . The following priorities may be assigned: 404-406 (0.8), 406-408 (0.3), 408-410 (0.5), and 410-404 (0.7). With such priorities, the link between entities 406 and 408 may be broken resulting in a resolved directed acyclic order 408, 410, 404, 406. FIG. 4B illustrates the drawing of FIG. 4A wherein the cyclic chain has been resolved.

As described above, a set of one or more rules are utilized to define the ordering for two or more overlapping entities. Such rules may only need to be invoked or complied with when two or more entities 304 overlap/intersect. If two entities 304 do not intersect (e.g., entity 402 and entity 412), there is no conflict and the draw order may default to the date of creation or may not be assigned at all. Accordingly, draw order rules may only be necessary for intersecting entities 304.

Figure 5A:
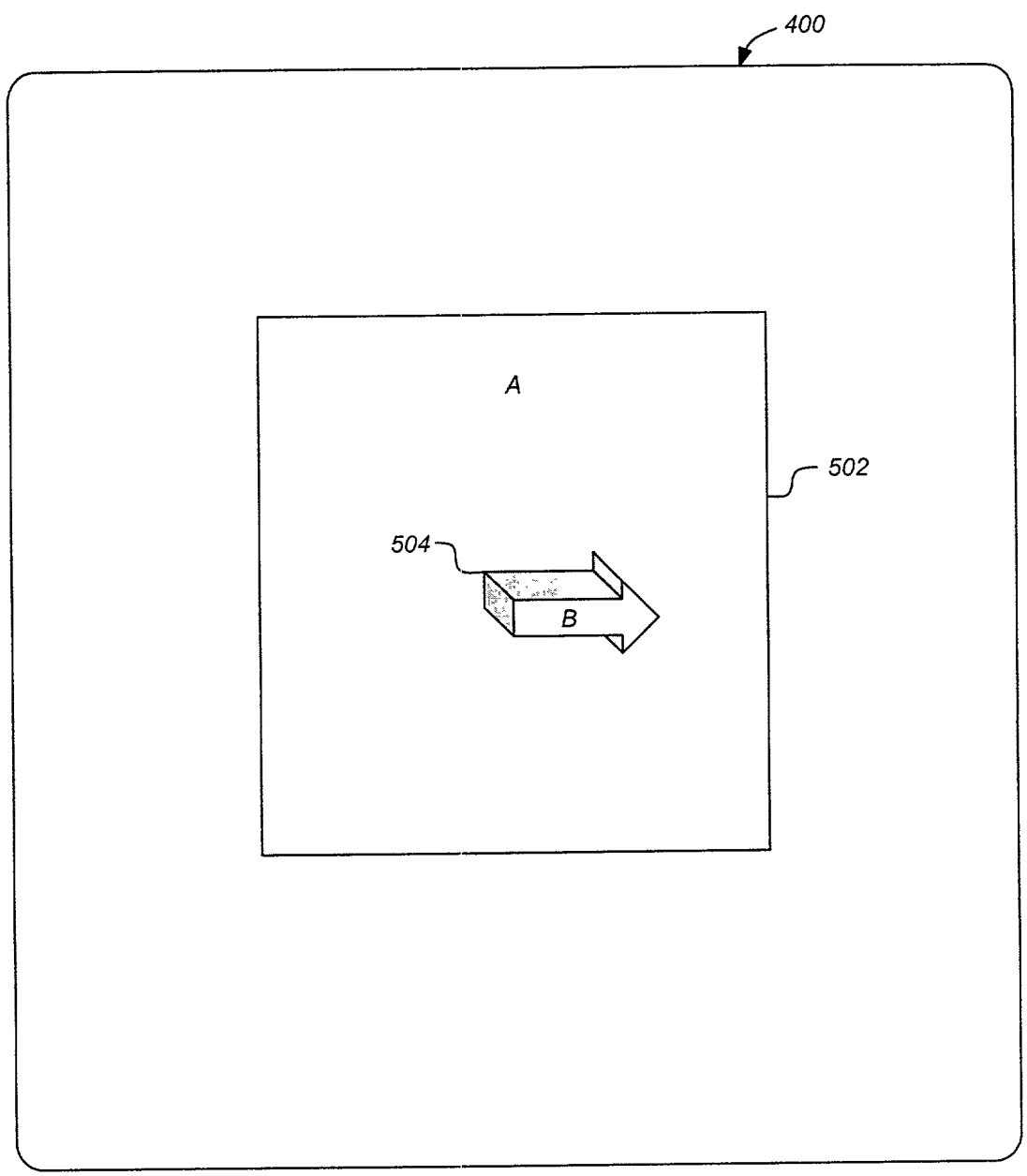
FIG. 5A illustrates overlapping entities in accordance with one or more embodiments of the invention.

Several general rules may be used to provide default ordering procedures for the majority of intersecting entities 304. With intersecting entities 304, either an entity 304 is entirely contained within another entity 304 (as illustrated in FIG. 5A—entity A 502 contains entity B 504) or an entity 304 intersects with but does not contain another entity 304 (as illustrated in FIG. 4A—entities 404-410 intersect but do not contain each other). Accordingly, two general rules may be used to address intersecting entities 304—one rule for containing entities 304 and one for non-containing entities 304.

Referring to FIG. 5A, the containing rule may provide that if a given entity A 502 completely contains another entity B 504, the containing entity (i.e., entity A 502) should be drawn first.

The non-containing rule provides that the entity 304 that obscures the other entity 304 the least should be drawn last. Various tests may be used to determine which entity 304 is obscured the most/least by another entity 304. One such test calculates the area of intersection (actual collision and not just a bounding box) and compares the area of intersection to the entity area (i.e., the pixels drawn). Such a comparison may be computed with respect to a bounding box that surrounds the area of intersection. Alternatively, the entire area of the entities 304 may be used in a comparison.

Figure 5B:
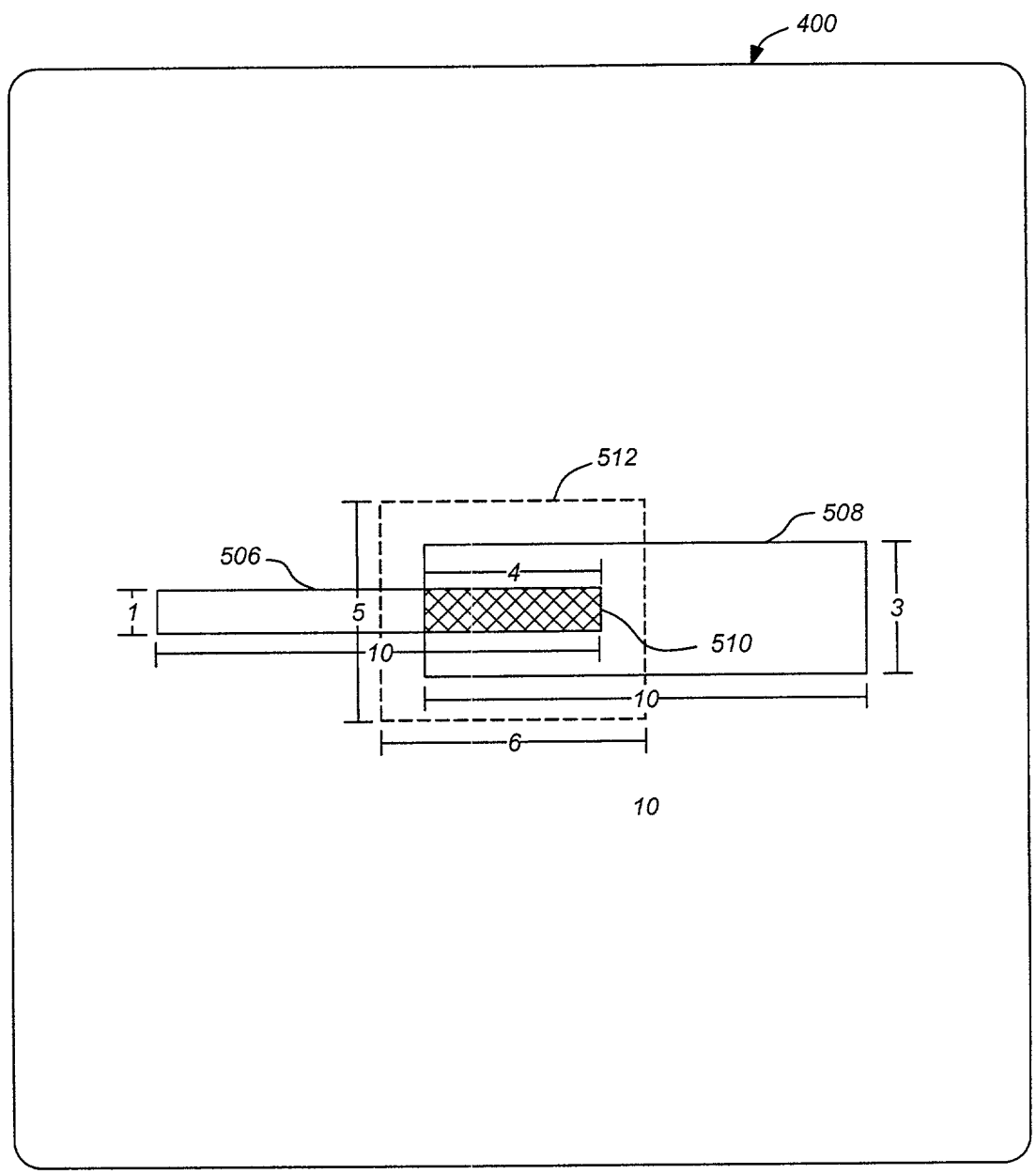
FIG. 5B illustrates a thin line entity intersecting with a wide line entity in accordance with one or more embodiments of the invention.

FIG. 5B illustrates a thin line entity 506 intersecting with a wide line entity 508 with an overlap region 510 within bounding box 512. As illustrated, the bounding box 512 surrounding the area of intersection 510 is 30 units (5×6), the intersecting region 510 is 4 units (4×1), the thin line entity 506 is 10 units (10×1), and the wide line entity 508 is 30 units (10×3). Thus, 4 out of 10 of the thin line entity's 506 units would be obscured, while only 4 out of 30 of the wide line entity's 508 units would be obscured. In FIG. 5B, the thin line entity 506 should be drawn last because it obscures the wide line entity 508 less than the wide line entity 508 would obscure the thin line entity 506. Any type or unit of measurement may be used in the comparison calculations. For example, pixels, inches, millimeters, etc. may be selected as the unit of measurement.

Alternatively, two entities 304 may be sorted by their area, regardless of their intersecting area or whether they overlap at all. For example, a large polygon may be drawn before a small polygon, and a line (with virtually no area) may be drawn after both polygons. Areas of polygons may be calculated by standard geometric means, and areas of lines may be calculated by assigning an implied width of a value near zero and multiplying the implied width by the line's length. Such an area calculation and comparison may have the effect of drawing polygons before lines. Further, such an area calculation and comparison is similar to calculating relative area intersection percentages as described above since a small polygon will always have a larger fraction of it obscured than the larger polygon simply by being smaller. However, an advantage of ordering a drawing based on such an area calculation is that the calculations may be performed faster than the calculations for intersecting areas as described above.

Alternatively, an area comparison (similar to above) may be performed by comparing bounding rectangles of entities 304 (e.g., polygons). Such bounding rectangles may be aligned with the coordinate axes and may be performed relatively quickly. However, such an area comparison may not work as well as the above area comparison for data sets with lines.

Using either area comparison as described above, an entire drawing may be sorted by object area. Such a sorting may reduce a directed acyclic graph into a single list.

In addition to the above described general rules, specific exception or correction rules may also affect the drawing order. While additional rules may be driven differently (e.g., exceptions being pre-set while corrections being user driven), the rules operate similarly. Such specific rules would likely take priority over the general rules described above. An example of a preset rule might be that a text entity 402 is drawn after any other type of entity 304, even if it should be different on the area rule, (e.g., block text over a hatch pattern).

The specific rules may be of an absolute or relative nature. An absolute rule is a rule that only applies to a single entity 304 regardless of other entities 304 that it intersects with. Further, an absolute rule is an absolute requirement that must be complied with. For example, "text is always drawn last" may be an absolute rule. A relative rule provides a relationship between two or more entities 304 and is dependent on attributes of the two intersecting entities 304. For example, "vector entities are drawn after raster entities" is a relative rule in that the draw order is dependent on attributes (i.e., vector v. raster) of the two intersecting entities 304.

Following are examples of various absolute and relative rules that may override the general rules described above.

Specific entity A after specific entity B;
Entities on layer A after entities on layer B;
Entities with attribute A=value1 after entities with attribute B=value2;
Entities of type A after entities of type B;
Specific entity A first/last;
Entities on layer A first/last;
Entities with attribute A=value first/last; and
Entities of type A first/last.

One or more rules may be combined to provide complex rules. Such rules may be combined using any type(s) or number of logical operator (e.g., AND, OR, and/or NOT). For example, one complex rule may be "Entities with attribute A=value1 AND of type B after specific entity C OR entities on layer D . . . "

In addition to any predefined rules that may be provided by a drawing program 108, a user may have the ability to invoke a command to correct the order, specify a new rule (either absolute or relative), or swap the order of entities (or classes of entities). For example, a user may be prompted with a dialog asking if a reorder was for specific entities 304. If not, the user may create a new rule by selecting the attributes/type/etc. of the entities 304 that need to be swapped. Thereafter, the directed acyclic graph may be traversed to locate other such draw-orders that need to be modified pursuant to the changes.

Alternatively, logic within drawing program 108 may monitor a user's actions and automatically (with or without user input) adjust/update rules appropriately by inference. For example, if drawing program 108 determines/infers that a user is repetitively modifying the draw order such that entities 304 with valueA=2 are drawn after entities 304 with valueA=4, a new rule may be created that specifies such entity 304 ordering. Additionally, rules may be deleted, reversed, or modified based on the user's actions. The particular user's actions to be evaluated may also vary from examining the user's actions in the current drawing, to past drawings, to all drawings in a certain folder/directory, to all other user's actions, etc. Thus, if one user modifies a draw order in a consistent manner, the system may update the rules for all other users of the program 108 on the network, registered, etc.

Once a modified rule has been established, there may be another correction to the drawing order. For example, a broadly applied correction may cause the violation of another rule resulting in an undesired draw order. A user/system may attempt to correct the result. For example, the user/system may create a specific entity 304 rule or a more specific AND'd rule to distinguish the rule from the earlier correction rule. To go into effect, such corrections of corrections may be assigned a higher strength/priority than an earlier correction rule. Such priorities may be necessary to to resolve A→B vs. B→A in a graph cycle. Accordingly, one or more specific entity 304 rules may be assigned the highest strength/priority while other rules increase in strength as more and more AND clauses make the rules more and more specific.

Figure 6:
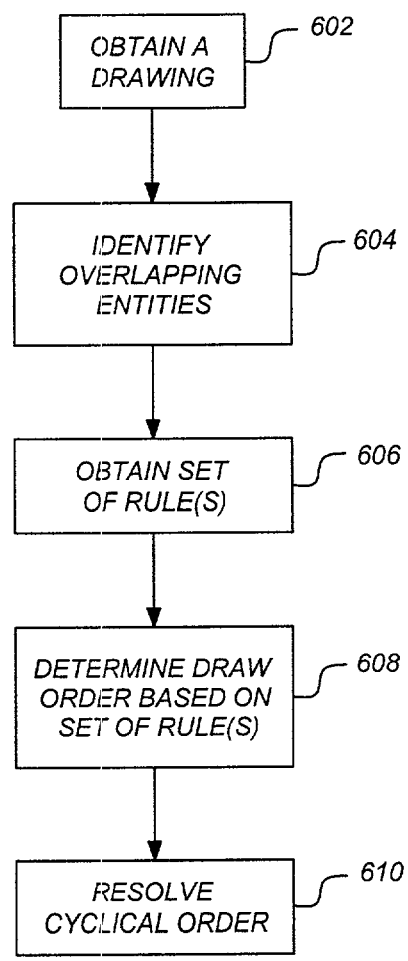
FIG. 6 is a flowchart illustrating the automation of draw order in accordance with one or mote embodiments of the invention.

FIG. 6 is a flowchart illustrating the automation of draw order in accordance with one or more embodiments of the invention. At step 602, a drawing output from a computer is obtained. The drawing output may be output by display on a monitor, output to a printer, or output to another output device. At step 604, the drawing is examined to identify two or more entities 304 that overlap/intersect. Such a determination may be used to resolve an existing drawing with intersecting entities 304. Alternatively, prior to drawing a new entity 304, a determination may be made regarding whether the new entity will intersect with any existing entities.

At step 606, a set of one or more rules is obtained. At step 608, drawing program 108 automatically determines the drawing order for the two or more overlapping (or potentially overlapping when a new entity 304 is being drawn) entities 304 based on the set of rule(s). As described above, this step may include creating a directed graph (acyclic or cyclic) and/or assigning priorities to order relationships (the order/relationship for two or more entities 304). Thus, the ordering is created to ensure compliance with the rules. Once the order has been determined, any cyclical ordering is resolved at step 610 (e.g., by breaking the cyclical chain at the lowest priority link).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method, apparatus, and article of manufacture for automating the drawing order of entities based on a set of one or more rules.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for automating a draw order of entities output from a computer, comprising:
    examining a drawing output from the computer to identify two or more entities that intersect in a two dimensional space;
    automatically creating a drawing order for the two or more entities based on a set of one or more predefined rules, wherein the drawing order comprises a sequence for drawing the two or more entities on a display device, and wherein one or more of the predefined rules comprise determining that a first entity is drawn prior to a second entity if the first entity obscures the second entity more than the second entity obscures the first entity; and
    drawing the two or more entities on the display device based on the drawing order.

2. The computer-implemented method of claim 1 wherein the set of one or more predefined rules provide that the drawing order is based on areas of the two or more entities.

3. The computer-implemented method of claim 1 further comprising obtaining a directed acyclic graph that designates the drawing order for the two or more entities in accordance with the creating.

4. The computer-implemented method of claim 3 wherein the directed acyclic graph may be traversed from multiple start entities to be drawn first towards multiple end entities to be drawn last.

5. The computer-implemented method of claim 3 wherein obtaining a directed acyclic graph comprises:

obtaining a directed cyclic graph that designates a drawing order for the two or more entities in accordance with the determining;
    assigning priorities to the drawing order; and
    breaking the directed cyclic graph based on the assigned priorities.

6. The computer-implemented method of claim 5 wherein the priorities are assigned based on strengths assigned to the one or more predefined rules.

7. The computer-implemented method of claim 1 wherein one or more of the predefined rules provide for drawing a first entity prior to a second entity when the first entity contains the second entity.

8. The computer-implemented method of claim 1 wherein the one or more predefined rules determine whether the first entity obscures the second entity more than the second entity obscures the first entity by:
    obtaining an area of intersection where the first entity overlaps with the second entity;
    obtaining a first entity intersection percentage as the area of intersection over an area of the first entity;
    obtaining a second entity intersection percentage as the area of intersection over an area of the second entity;
    comparing the first entity intersection percentage to the second entity intersection percentage;
    determining that the first entity obscures the second entity more than the second entity obscures the first entity when the first entity intersection percentage is higher than the second entity intersection percentage.

9. The computer-implemented method of claim 1 wherein one or more of the predefined rules are absolute, wherein an absolute rule comprises a rule that applies to a first entity of the two or more entities regardless of other entities that the first entity intersects with.

10. The computer-implemented method of claim 1 wherein one or more of the predefined rules are relative, wherein a relative rule provides a relationship between the two or more entities and is dependent on attributes of the two or more entities.

11. The computer-implemented method of claim 1 wherein two or more of the predefined rules may be combined using a logical operator.

12. The computer-implemented method of claim 1 further comprising:
    receiving input from a user; and
    adjusting the drawing order based on the input.

13. The computer-implemented method of claim 12 wherein adjusting the drawing order comprises modifying the one or more rules based on observations of the input.

14. The computer-implemented method of claim 1 wherein the one or more predefined rules may be modified by a user.

15. A computer-implemented system for automating a draw order of entities, comprising:
    (a) a computer having an output device attached thereto;
    (b) a computer graphics program executing on the computer, wherein the computer graphics program is configured to output two or more entities to an output device;
    (c) means, performed by the computer graphics program, for examining a drawing output from the computer to identify two or more entities that intersect in a two-dimensional space;
    (d) means, performed by the computer graphics program, for automatically creating a drawing order for the two or more entities based on a set of one or more predefined rules, wherein the drawing order comprises a sequence for drawing the two or more entities on a display device, and wherein one or more of the predefined rules comprise means, performed by the computer graphics program, for determining that a first entity is drawn prior to a second entity if the first entity obscures the second entity more than the second entity obscures the first entity; and (e) means, performed by the computer graphics program, for drawing the two or more entities on the display device based on the drawing order.

16. The system of claim 15 wherein the set of one or more predefined rules provide that the drawing order is based on areas of the two or more entities.

17. The system of claim 15 further comprising means, performed by the computer graphics program, for obtaining a directed acyclic graph that designates the drawing order for the two or more entities in accordance with the creating.

18. The system of claim 17 wherein the directed acyclic graph may be traversed from multiple start entities to be drawn first towards multiple end entities to be drawn last.

19. The system of claim 17 wherein the means for obtaining a directed acyclic graph comprises:
   means, performed by the computer graphics program, for obtaining a directed cyclic graph that designates a drawing order for the two or more entities in accordance with the determining;
   means, performed by the computer graphics program, for assigning priorities to the drawing order; and
   means, performed by the computer graphics program, for breaking the directed cyclic graph based on the assigned priorities.

20. The system of claim 19 wherein the priorities are assigned based on strengths assigned to the one or more predefined rules.

21. The system of claim 15 wherein one or more of the predefined rules provide for drawing a first entity prior to a second entity when the first entity contains the second entity.

22. The system of claim 15 wherein the one or more predefined rules determine whether the first entity obscures the second entity more than the second entity obscures the first entity by:
   obtaining an area of intersection where the first entity overlaps with the second entity;
   obtaining a first entity intersection percentage as the area of intersection over an area of the first entity;
   obtaining a second entity intersection percentage as the area of intersection over an area of the second entity;
   comparing the first entity intersection percentage to the second entity intersection percentage;
   determining that the first entity obscures the second entity more than the second entity obscures the first entity when the first entity intersection percentage is higher than the second entity intersection percentage.

23. The system of claim 15 wherein one or more of the predefined rules are absolute, wherein an absolute rule comprises a rule that applies to a first entity of the two or more entities regardless of other entities that the first entity intersects with.

24. The system of claim 15 wherein one or more of the predefined rules are relative, wherein a relative rule provides a relationship between the two or more entities and is dependent on attributes of the two or more entities.

25. The system of claim 15 wherein two or more of the predefined rules may be combined using a logical operator.

26. The system of claim 15 further comprising:
   means, performed by the computer graphics program, for receiving input from a user; and
   means, performed by the computer graphics program, for adjusting the drawing order based on the input.

27. The system of claim 26 wherein the means for adjusting the drawing order comprises means, performed by the computer graphics program, for modifying the one or more rules based on observations of the input.

28. The system of claim 15 wherein the one or more predefined rules may be modified by a user.

29. A computer readable article of manufacture comprising a computer readable medium having instructions for causing a computer to execute a method for automating a draw order of entities output from a computer, the method comprising:
   examining a drawing output from the computer to identify two or more entities that overlap in a two dimensional space;
   automatically creating a drawing order for the two or more entities based on a set of one or more predefined rules, wherein the drawing order comprises a sequence for drawing the two or more entities on a display device, and wherein one or more of the predefined rules comprise determining that a first entity is drawn prior to a second entity if the first entity obscures the second entity more than the second entity obscures the first entity; and
   drawing the two or more entities on the display device based on the drawing order.

30. The computer readable article of manufacture of claim 29 wherein the set of one or more predefined rules provide that the drawing order is based on areas of the two or more entities.

31. The computer readable article of manufacture of claim 29, the method further comprising obtaining a directed acyclic graph that designates the drawing order for the two or more entities in accordance with the creating.

32. The computer readable article of manufacture of claim 31 wherein obtaining a directed acyclic graph comprises:
   obtaining a directed cyclic graph that designates a drawing order for the two or more entities in accordance with the determining;
   assigning priorities to the drawing order; and
   breaking the directed cyclic graph based on the assigned priorities.

33. The computer readable article of manufacture of claim 32 wherein the priorities are assigned based on strengths assigned to the one or more predefined rules.

34. The computer readable article of manufacture of claim 29 wherein the directed acyclic graph may be traversed from multiple start entities to be drawn first towards multiple end entities to be drawn last.

35. The computer readable article of manufacture of claim 29 wherein one or more of the predefined rules provide for drawing a first entity prior to a second entity when the first entity contains the second entity.

36. The computer readable article of manufacture of claim 29 wherein the one or more predefined rules determine whether the first entity obscures the second entity more than the second entity obscures the first entity by:
   obtaining an area of intersection where the first entity overlaps with the second entity;
   obtaining a first entity intersection percentage as the area of intersection over an area of the first entity;
   obtaining a second entity intersection percentage as the area of intersection over an area of the second entity;
   comparing the first entity intersection percentage to the second entity intersection percentage;
   determining that the first entity obscures the second entity more than the second entity obscures the first entity when the first entity intersection percentage is higher than the second entity intersection percentage.

37. The computer readable article of manufacture of claim 29 wherein one or more of the predefined rules are absolute, wherein an absolute rule comprises a rule that applies to a first entity of the two or more entities regardless of other entities that the first entity intersects with.

38. The computer readable article of manufacture of claim 29 wherein one or more of the predefined rules are relative, wherein a relative rule provides a relationship between the two or more entities and is dependent on attributes of the two or more entities.

39. The computer readable article of manufacture of claim 29 wherein two or more of the predefined rules may be combined using a logical operator.

40. The computer readable article of manufacture of claim 29, the method further comprising:
 receiving input from a user; and
 adjusting the drawing order based on the input.

41. The computer readable article of manufacture of claim 40 wherein adjusting the drawing order comprises modifying the one or more rules based on observations of the input.

42. The computer readable article of manufacture of claim 29 wherein the one or more predefined rules may be modified by a user.

* * * * *